J. M. WALSH.
HAME FASTENING.
APPLICATION FILED DEC. 3, 1915.
1,358,348.
Patented Nov. 9, 1920.
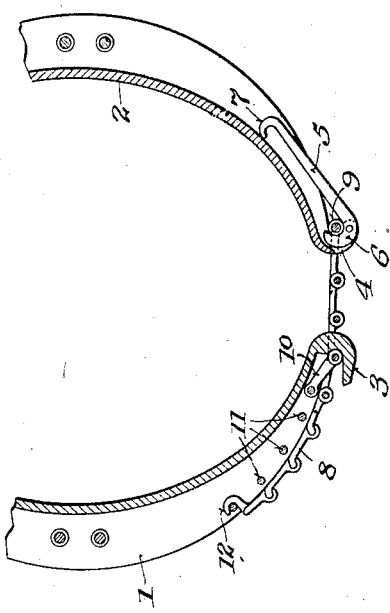
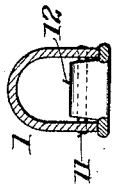
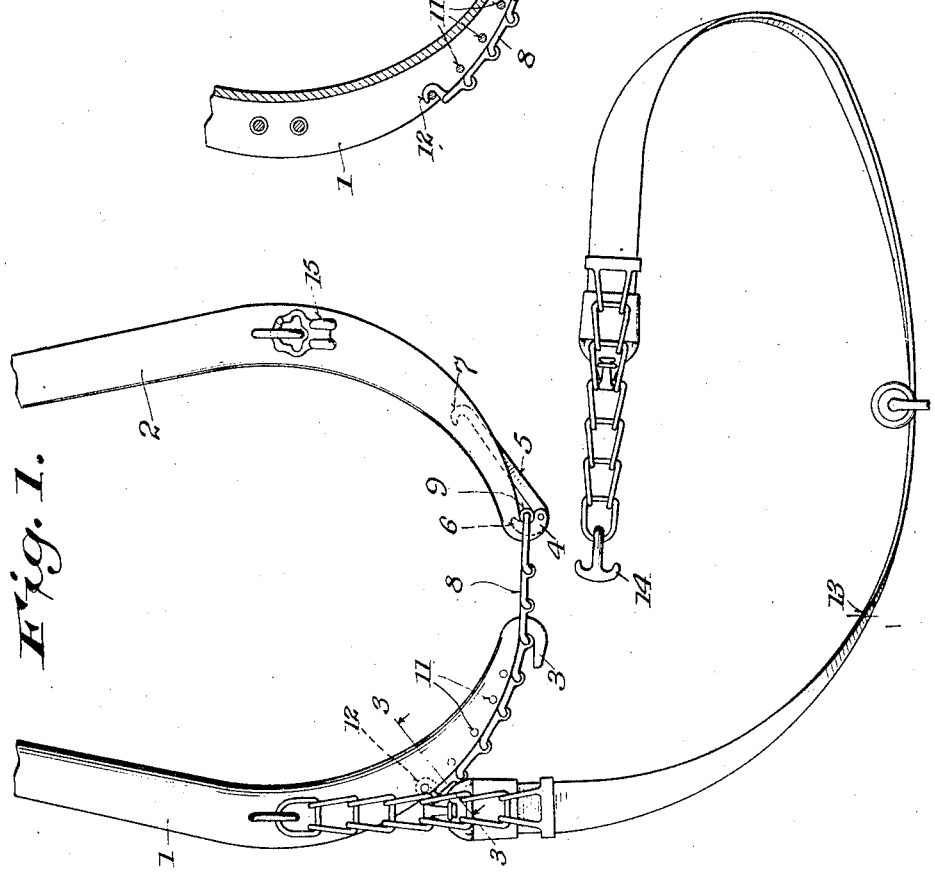
Inventor:
James M. Walsh,
By Flanders Bottum Fawsett & Booth
Attorneys.

UNITED STATES PATENT OFFICE.

JAMES M. WALSH, OF STOCKBRIDGE, WISCONSIN, ASSIGNOR TO WALSH HARNESS COMPANY, OF WILMINGTON, DELAWARE, A CORPORATION OF DELAWARE.

HAME-FASTENING.

1,358,348.   Specification of Letters Patent.   Patented Nov. 9, 1920.

Original application filed January 25, 1915, Serial No. 4,159. Divided and this application filed December 3, 1915. Serial No. 64,808.

*To all whom it may concern:*

Be it known that I, JAMES M. WALSH, a citizen of the United States, residing at Stockbridge, in the county of Calumet and State of Wisconsin, have invented certain new and useful Improvements in Hame-Fastenings, of which the following is a specification, reference being had to the accompanying drawing, forming a part thereof.

This invention relates more particularly to fastenings for adjustably and detachably connecting the lower ends of hames.

The main objects of the invention are to facilitate applying hames to collars and removing the same therefrom; to facilitate the adjustment of the hames to collars of different sizes and shapes; to avoid the use of leather fastenings and buckles; and generally to simplify and improve the construction and operation of devices of this class.

The invention consists in certain novel features of construction and in the peculiar arrangement and combination of parts as hereinafter particularly described and pointed out in the claims.

In the accompanying drawing like characters designate the same parts in the several figures.

Figure 1 is a front elevation of the lower portion of a pair of hames provided with a fastening embodying the invention; Fig. 2 is a similar view of the fastening, the hames to which it is applied being shown in longitudinal section; and Fig. 3 is an enlarged cross section on the line 3—3, Fig. 1, of one of the hames.

The hames 1 and 2, which may be made of any suitable material, such as wood or metal, or partly of wood and partly of metal, but preferably, as shown, of sheet metal pressed into the desired shape, are of channel or recessed form, and terminate at their lower ends in downwardly and outwardly bent hooks 3 and 4.

A lever 5, formed at the ends with reverse hooks 6 and 7, is pivoted in or to the end of the hame hook 4, which is preferably forked for this purpose, so that the hook 6 will, when the lever is closed, approximately coincide with the hook 4, and the hook 7 at the other end of the lever will lie wholly within the channel or recess of the hame 2, leaving an open space between the lever and hame adjacent to the hooks 4 and 6, as shown in Figs. 1 and 2. The free end of the lever 5, which is provided with the hook 7, is thus prevented when the lever is closed, from catching on obstructions, which might otherwise turn it downward or outward and release the fastening.

A chain 8, engaged by one of a number of its links with the hook 3 on the hame 1, has at one end a link or ring provided with a roller 9 and adapted to pass over the hook 7 on the lever 5 when the latter is turned downward or outward away from the hame and to be forced thereby into the bight of the hook 6 and of the hook 4 on the hame 2, when said lever is turned back into the channel of said hame, as shown in the drawing.

The hame 1 has a latch 10, pivoted therein and adapted when turned downward into the position shown in Fig. 2, to engage with the cross bar of the link on hook 5 and to hold said link in place on said hook.

The surplus or unused portion of the chain 8 is adjustably fastened to and held up against the hame 1, thus preventing this portion of the chain from rattling, wearing and hanging loosely downward in the way. Of the various means which may be employed, the following are shown as suitable for this purpose:

The hame 1 is provided with a series of cross pins or bars 11, spanning the channel therein and spaced to correspond with the length of the links of the chain 8. The link at the end of the chain 8 opposite the roller 9 is provided with an inwardly and outwardly bent hook 12, which is adapted to be engaged with one of the cross pins or bars 11, according to the adjustment of the fastening.

To adjust the length of the fastening for collars of different widths, shapes or sizes, the span of the chain 8 between the hooks 3 and 4 is lengthened or shortened when the hames are removed from a collar, by turning the latch 10 upwardly into the channel of hame 1 out of engagement with the cross bar of the link on the hook 5, thus releasing said link, which is then withdrawn from the hook, thereby releasing the end link provided with the hook 12, which is then removed from the cross pin 11 with which it is engaged. The hook 12 is then engaged with another cross pin 11, according to the desired adjustment of the fastening, and another link corresponding with such adjustment is placed in position over the hook 3, the latch 10 being dropped into engagement with its cross bar to hold it in place, as shown in Fig. 2.

When the hames are applied to a collar, the fastening cannot be accidentally detached or disengaged, and when the hames are removed from the collar, the chain 8 cannot with ordinary handling, be disengaged from the hook 3, and the hook 12 cannot be released from the cross pin 11 with which it is engaged.

When the fastening is properly adjusted for a collar of a given size and shape, the hames are easily applied to and fastened on the collar by placing them in position over the top of the collar in the usual way, then drawing the end link of the chain 8 provided with the roller 9 over the open lever 5, and finally turning said lever up into the channel of the hame 1, thereby forcing the roller 9 into the bight of the hook 4 and drawing and holding the hames snugly and tightly into the channel of the collar between its fore and after wales. The strain or pull on the chain 8 between the hooks 3 and 4 securely holds the lever 5 in its closed position, as shown in the drawing.

To release and remove the hames from the collar, the lever 5 is turned downward, thereby forcing the roller 9 out of the bight of the hook 4.

As the fastening is subjected to considerable strain, or requires considerable force to undo it, and as the opening between the hame 2 and lever 5 is small, it is necessary to use some instrument such as a hook, for opening said lever. In order that such an instrument may always be conveniently at hand, the breast strap 13, which is connected at one end with the hame 1, is provided at the other end with a double hook or T 14, forming with a forked hook or keeper 15, which is attached to the hame 2, a detachable fastening. This hook or T 14, either prong or branch of which is fitted to pass readily through the opening between the closed lever 5 and the hame 2, also serves as a convenient instrument which is always at hand for opening said lever.

When the shank of the hook or T 14 is grasped to disengage it from the hook or keeper 15, preparatory to removing the hames from a collar in unharnessing a horse, the same hold on the hook or T serves for its manipulation to open the lever 5 and disengage the chain 8 from the hook 3. After the hook 14 is removed from the keeper 15, one of its prongs or branches is inserted between the lever 5 and hame 2 and then drawn outward into engagement with the hook 7, which prevents the hook 14 from slipping off the free end of the lever, and indicates to the operator when said hook is in position to act to the best advantage on said lever. By a downward pull on the hook 14 the lever 5 is now easily opened and the chain 8 forced off from the hand hook 4. These operations can be easily and quickly performed in the dark, with cold, numb or stiff fingers.

Various changes in the details of construction and arrangement of parts of the hames and fastening may be made without departure from the principle and scope of the invention as defined in the following claims.

This application is a division of application Serial No. 4159, filed January 25, 1915.

I claim:

1. The combination with hames terminating at their lower ends in hooks, one of said hames having a longitudinal channel adjacent its hook, of a lever fulcrumed to the end of the hook adjacent said channel and having terminal hooks, one of which is reverse to and approximately coincides with the hame hook when the lever is closed, there being an open space between the lever and hame adjacent to the hame hook and the other terminal lever hook lying within the channel of the hame when said lever is closed, a chain having a terminal link adapted to be forced by said lever into and out of the bight of the hook to which the lever is fulcrumed and a number of links any of which may be engaged with the hook of the other hame, and means adapted to hold the chain in engagement with the hook of the last mentioned hame.

2. The combination with hames having reverse hooks at their lower ends, of a hooked lever fulcrumed to the end of one hame hook, the other hame having a longitudinal channel in the outer side and provided with a series of transverse pins spanning the channel, and a chain having a link at one end adapted to be forced by said lever into and out of the bight of the hook to which the lever is fulcrumed and a hook at the other end adapted to be engaged with a cross pin in the other hame, one of the intermediate links of the chain, according to its adjustment, being engaged with the hook of the last mentioned hame.

3. The combination with hames having longitudinal channels in the outer sides of their lower ends and terminating in reverse hooks, of a lever having a hook at one end and fulcrumed adjacent to that end to the hook of one hame, the other hame having a latch pivoted therein adjacent to its hook and a series of transverse pins spanning its channel, and a chain having a link at one end adapted to be forced by said lever into and out of the bight of the hook to which the lever is fulcrumed and a hook at the other end adapted to be engaged with one of said pins, any of a number of the intermediate links of the chain, according to its adjustment, being engaged with the hook of the same hame and held in engagement therewith by said latch.

4. The combination with hames one of which terminates at its lower end in a hook and is formed adjacent thereto in its outer side with a longitudinal channel, of a lever fulcrumed to the end of the hame hook and having reverse terminal hooks, one approximately coinciding in closed position with the hame hook and the other adapted to close into said channel leaving an open space between the hame and lever adjacent to the hame hook, a chain connected with the other hame and having a terminal link adapted to be forced by said lever into and out of the bight of said hame hook, and a hook connected with one of the hames and adapted to be inserted through said open space and drawn outward into engagement with the hook at the free end of the lever for opening the lever and releasing the chain.

5. The combination of hames, one of which is provided at its lower end with a hook and adjacent the hook with a longitudinal recess, a chain adapted to be engaged by any of a series of its links with said hook to vary its effective length, and means for detachably connecting one end of the chain with the other hame, the surplus portion of the chain beyond the link engaged with said hook being positioned within the recessed end of the hame.

6. In a hame fastening the combination with hames one of which has a downwardly and outwardly turned hook at its lower end and an outwardly opening longitudinal channel adjacent to said hook, of a lever having inwardly turned hooks at the ends and fulcrumed adjacent to one of its hooks to the end of the hame hook, one of the lever hooks approximately coinciding with the hame hook and the other lever hook closing into said channel when the lever is turned up into locking position, and a chain adjustably connected with the lower end of the other hame and having a terminal link adapted to pass over said lever in its open position and to be forced thereby into and out of engagement with said hame hook, a space being provided between the closed lever and hame adjacent to the hame hook for the insertion of an instrument for opening the lever, and the hook at the free end of the lever serving to limit the outward movement of said instrument in position for forcing the lever open.

In witness whereof I hereunto affix my signature in presence of two witnesses.

JAMES M. WALSH.

Witnesses:
PAUL E. HERB,
PETER PUETZ.